United States Patent [19]

Hansen

[11] Patent Number: 4,509,109
[45] Date of Patent: Apr. 2, 1985

[54] ELECTRONICALLY CONTROLLED COIL ASSEMBLY

[76] Inventor: Thomas C. Hansen, 1115 Sir Francis Drake Blvd., Apt. A, Kentfield, Calif. 94904

[21] Appl. No.: 417,222

[22] Filed: Sep. 13, 1982

[51] Int. Cl.³ .............................................. H02M 7/06
[52] U.S. Cl. ..................................... 363/126; 310/14; 323/351; 323/355; 336/200; 361/398; 361/412; 335/282
[58] Field of Search ........................ 323/349, 351, 355; 336/200, 206, 223; 361/398, 407, 414, 412, 413; 335/282; 310/13, 14; 360/106; 363/126

[56] References Cited

U.S. PATENT DOCUMENTS 3,102,245 8/1963 Lawson ............................... 336/205
3,726,004 4/1973 Holland et al. ..................... 336/200

FOREIGN PATENT DOCUMENTS 2032699 5/1980 United Kingdom ................ 335/282

OTHER PUBLICATIONS

Published U.S. Application Ser. No. 324,939, filed Mar. 20, 1940, Published May 18, 1943, to Stolojian.

Primary Examiner—William H. Beha, Jr.
Attorney, Agent, or Firm—Flehr, Hohbach, Test, Albritton & Herbert

[57] ABSTRACT

Electronically controlled coil assembly for use in electrical and electronic applications such as tuned circuits, transformers, and devices which require or utilize a moving magnetic field. The coil assembly comprises a plurality of electrical conductors carried by a substrate with electronically controlled elements for controlling the windings which are energized or connected into a circuit. Embodiments are disclosed in which the coil assembly is constructed both in printed circuit form and in microminiature form.

17 Claims, 4 Drawing Figures

ELECTRONICALLY CONTROLLED COIL ASSEMBLY

This invention pertains generally to coils for use in electrical and electronic applications, and more particularly to a coil assembly in which the energization of individual windings is electronically controlled.

Coils or inductors are employed in a wide variety of electrical and electronic applications such as tuned circuits, transformers, and other devices employing a stationary or moving magnetic field. Such coils typically consist of a continuous length of electrically conductive wire or other suitable material wound about a core or other suitable form. Some coils are provided with taps or connections to one or more windings between their ends to permit different portions of the coil to be selectively energized or connected into a circuit. Other coils are provided with adjustable tuning slugs or adjustable taps to provide different amounts of inductance. Such coils tend to be relatively cumbersome and inflexible and not readily suitable for certain applications.

It is in general an object of the invention to provide a new and improved coil assembly for use in electrical and electronic applications.

Another object of the invention is to provide a coil assembly of the above character in which the energization of individual windings is electronically controlled to provide different inductances, turns ratios, and/or sequences of energization.

Another object of the invention is to provide a coil assembly of the above character which can be employed in a variety of different applications such as tuned circuits, transformers and devices requiring or utilizing a moving magnetic field.

Another object of the invention is to provide a coil assembly of the above character which can be constructed in microminiature form.

These and other objects are achieved in accordance with the invention by providing an electronically controlled coil assembly comprising a substrate, first and second electrically conductive buses on the substrate for connection to a source of electrical energy, and a plurality of conductors on the substrate connected electrically in parallel between the buses to form the windings of a coil. Control means carried by the substrate is connected electrically in series with individual ones of the conductors for selectively controlling energization of the conductors. In one embodiment, the assembly is constructed in microminiature form on a semiconductor substrate, and in another it is constructed on a circuit board.

Figure 1:
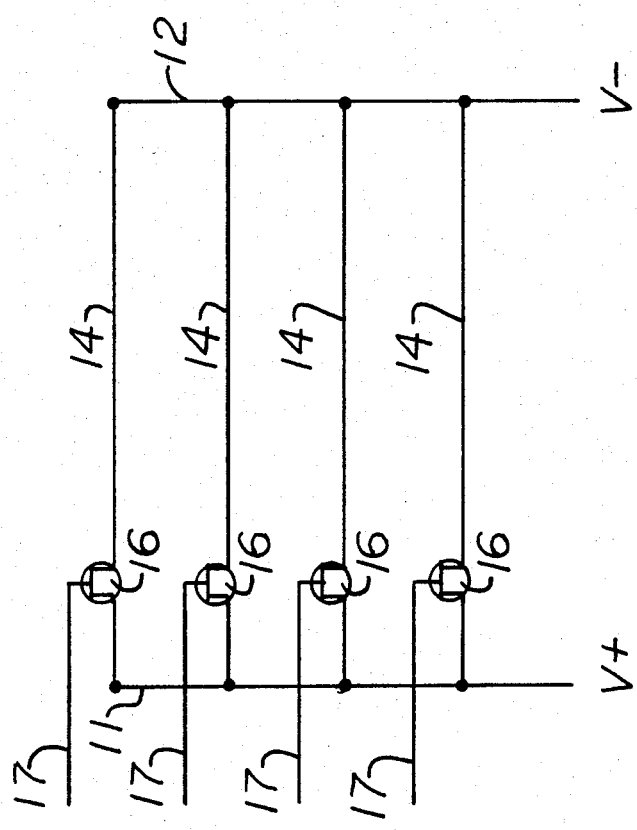
FIG. 1 is a block diagram of one embodiment of an electronically controlled coil assembly according to the invention.

As illustrated in FIG. 1, the coil assembly comprises a pair of electrically conductive buses 11, 12 which are connected to a source (+V, −V) of electrical energy. A plurality of electrical conductors 14 are connected electrically in parallel between the buses to form the windings of a coil, and electronic control elements 16 are connected electrically in series with the individual conductors to control the energization thereof. In the embodiment illustrated, the control elements comprise field effect transistors, and control signals are applied to the control gates of the field effect transistors. However, it will be understood that any other suitable control elements can be employed if desired. The conductors which form the coil windings are arranged in closely spaced parallel relationship on a suitable substrate, not shown in this figure, such as a printed circuit board or a semiconductor body. With a planar substrate, components of the magnetic field produced by energization of the coil assembly tend to cancel each other in a direction perpendicular to the plane of the windings and to reinforce each other in a direction parallel to this plane, resulting in generally planar fields parallel to the windings.

The number and manner in which the coil windings are energized or connected into a circuit is controlled by signals applied via control lines 17 to the control inputs of control elements 16. These elements can be turned or rendered conductive individually or in any desired group or groups and in any desired sequence by the application of suitable control signals.

Figure 2:
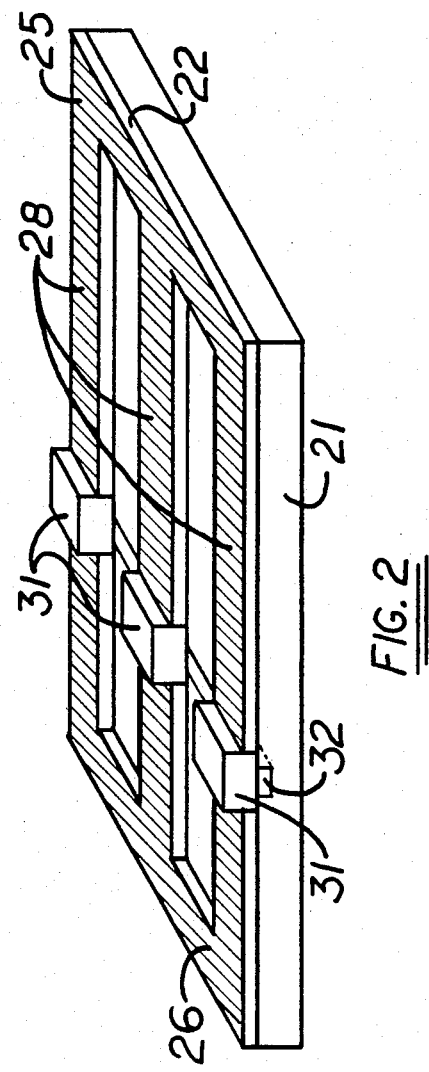
FIG. 2 is an isometric view, somewhat schematic, of one embodiment of a coil assembly incorporating the invention.

In the embodiment of FIG. 2, the substrate comprises a body 21 of semiconductor material having a generally planar upper surface 22. Buses 25, 26 are formed on this surface for connection to a source of electrical energy, and electrical conductors 28 extend between the buses in spaced parallel relation to from the windings of a coil. Control elements 31 such as field effect transistors are connected electrically in series with the coil windings to control the energization thereof, and control signals are applied to the control elements via control lines 32. In this embodiment, control elements 31 are formed by conventional techniques in the semiconductor body, and control lines 32, buses 25, 26 and conductors 27 are formed as metalization layers on the upper surface of the semiconductor body, with the control lines being positioned below and insulated from the coil windings. This embodiment can be constructed in microminiature form and mounted in a package of the type commonly employed for integrated circuits.

Figure 3:
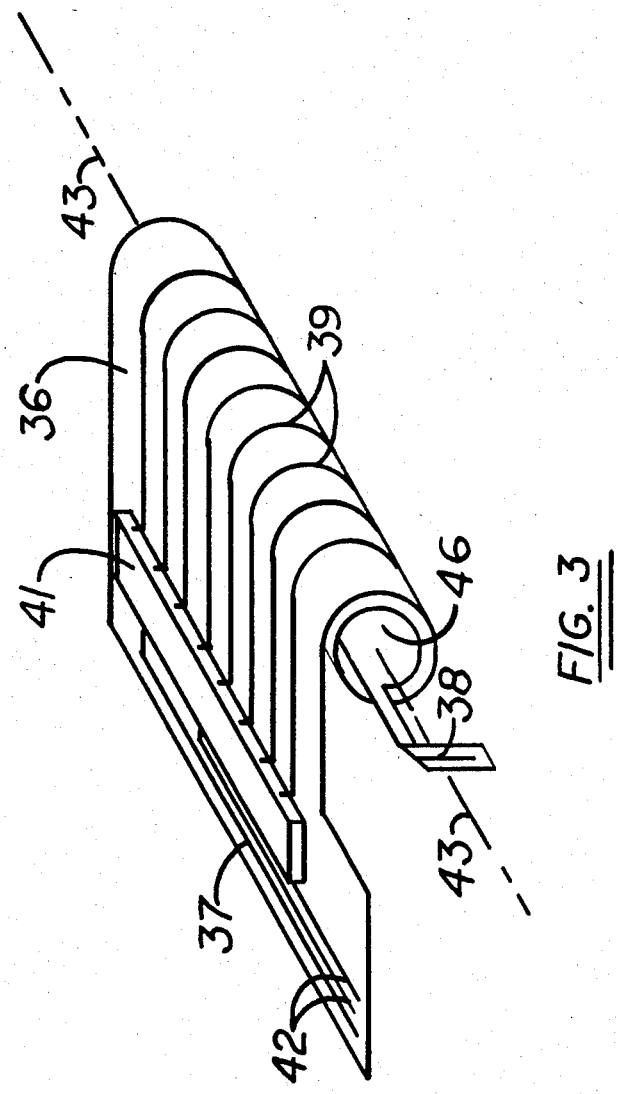
FIG. 3 is an isometric view, somewhat schematic, of a second embodiment of a coil assembly incorporating the invention.

FIG. 3 illustrates an embodiment of the invention which is particularly suitable for use in linear induction motors, loudspeaker coils, electron guns and other applications which require a moving magnetic field. This embodiment includes a substrate 36 which comprises a flexible, generally rectangular printed circuit board with electrically conductive buses 37, 38 extending in a lateral direction near the ends of the board for connection to a source of electrical energy. A plurality of electrical conductors 39 extend longitudinally of the board between the buses in spaced parallel relation to form the windings of a coil, and control elements 41 are connected electrically in series with the conductors toward one end of the board to control the energization of the windings. Control lines 42 extend laterally of the board and carry control signals to the control elements. In this embodiment, buses 37, 38, conductors 39 and control lines 42 are formed by a conductive metal foil on the flexible substrate.

Circuit board 36 is wrapped in spiral fashion about an axis 43 which extends in a direction generally perpendicular to the length of conductors 39, with the conductors encircling the axis and control elements 41 being positioned toward the outer end of the wrapped structure. In this embodiment, the magnetic field produced by the coil assembly is directed along axis 43 in the manner of a conventional helically wound coil, but the individual windings can be selectively energized to produce a magnetic field which moves along the axis in any desired manner. In an electron gun, for example, the coil windings can be energized sequentially from one side of the circuit board to the other to provide a magnetic field which travels along the axis.

As illustrated in phantom lines, a magnetically polarized armature 46 can be positioned within the wrapped coil assembly for movement along axis 43 in response to energization of the coil windings. The position of the armature and the manner in which it moves are determined by the manner in which the coil windings are energized, i.e., by the control signals applied to the control elements. Although illustrated schematically, armature 46 can be the armature member of a linear induction motor, the magnet of a loudspeaker, the armature of a solenoid, or the movable member of any other suitable device.

Figure 4:
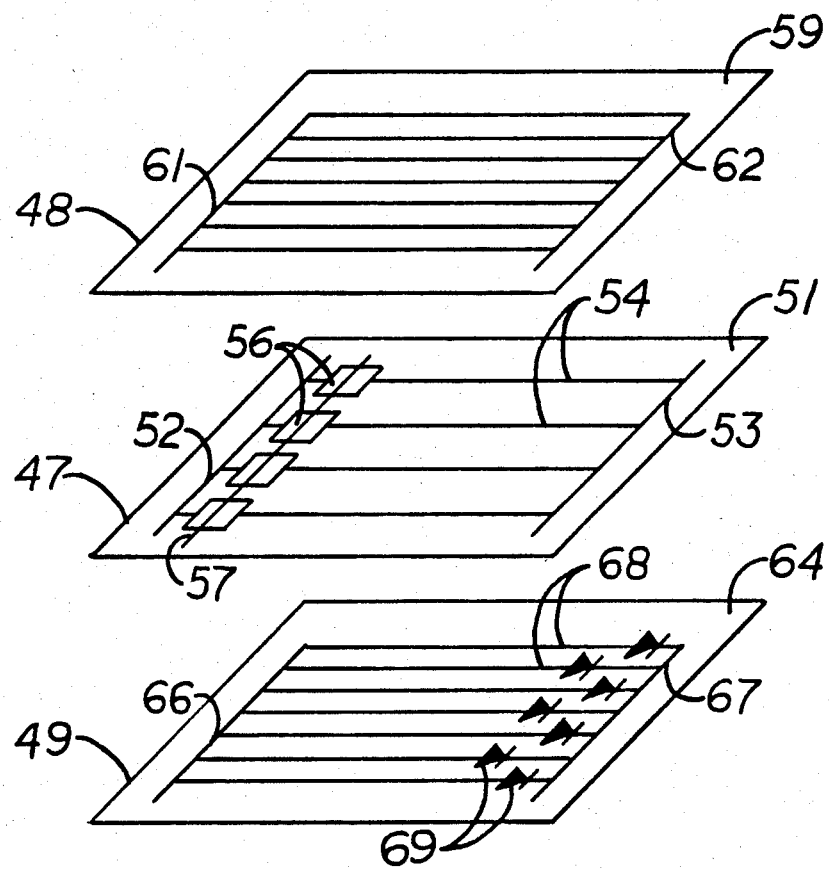
FIG. 4 is an exploded isometric view, somewhat schematic, of one embodiment of a transformer incorporating the coil assembly of the invention.

FIG. 4 illustrates the use of coil assembly 47 of the type heretofore described in combination with a pair of secondary windings 48, 49 to form a transformer. In this embodiment, coil assembly 47 comprises a rectangular generally planar substrate 51 with buses 52, 53 positioned toward opposite ends thereof for connection to a source of electrical energy. Electrical conductors 54 extend between the buses in spaced parallel relationship, and control elements 56 are connected electrically in series with the conductors to control the energization thereof. Control signals are applied to the control elements by a control line 57, and coil assembly 47 serves as the primary winding of the transformer.

Secondary winding 48 comprises a rectangular generally planar substrate 59 which is spaced from and generally parallel to substrate 51. Output buses or conductors 61, 62 extend across the substrate toward opposite ends thereof, and a plurality of electrical conductors 62 are connected electrically in parallel between the output connectors to form the windings of the secondary. These conductors are arranged in spaced parallel relationship, and the secondary winding is oriented with conductors 62 parallel to conductors 54 and within the magnetic field produced by energization of conductors 54.

Secondary winding 49 is generally similar to winding 48, and it includes a substrate 64, output conductors 66, 67, and conductors 68 which form the windings of the secondary. In addition, winding 49 includes rectifying elements or diodes 69 connected electrically in series with conductors 68 whereby the current induced in this winding is rectified to provide a DC output current.

In the transformer of FIG. 4, the primary and secondary winding assemblies are conveniently constructed in the form of printed circuits, with the conductors and buses comprising electrically conductive foils on circuit boards. Alternatively, a transformer of this type can be constructed on a single circuit board with one or more secondary windings on the opposite side of the board from the primary winding. The number of conductors in the respective windings can be selected to provide the desired turns ratios, and further adjustment of the output voltages can be provided by controlling the number of primary windings which are energized.

It is apparent from the foregoing that a new and improved electronically controlled coil assembly has been provided. While only certain presently preferred embodiments have been described, as will be apparent to those familiar with the art, certain changes and modifications can be made without departing from the scope of the invention as defined by the following claims.

I claim:

1. An electronically controlled coil assembly, comprising a substrate, a plurality of electrical conductors carried by the substrate and connected electrically in parallel to form the windings of a coil, and control means connected electrically in series with individual ones of the conductors for selectively controlling energization of said conductors.

2. The coil assembly of claim 1 wherein the electrical conductors are arrayed on the substrate in a generally parallel relationship, and the substrate is wrapped about an axis generally perpendicular to the length of the conductors.

3. The coil assembly of claim 1 including an additional winding coupled inductively to the electrical conductors to form a transformer.

4. The coil assembly of claim 1 including an armature member positioned in proximity to the electrical conductors for movement in response to energization of said conductors.

5. The coil assembly of claim 4 wherein the armature member is movable along an axis in a direction generally perpendicular to the conductors, and the substrate is wrapped about the axis with the conductors encircling the axis.

6. In combination: a substrate wrapped about an axis, a plurality of individually energizable conductors carried by the substrate and encircling the axis to form the windings of a coil, an armature member positioned within the wrapped substrate for movement along the axis in response to energization of the windings, and means for selectively energizing individual ones of the windings to control the position of the armature member along the axis.

7. An electronically controlled coil assembly, comprising a substrate, first and second electrically conductive buses carried by the substrate for connection to a source of electrical energy, a plurality of electrical conductors carried by the substrate connected electrically in parallel between the buses to form the windings of a coil, and control means carried by the substrate and connected electrically in series with individual ones of the conductors for selectively controlling energization of said conductors.

8. The coil assembly of claim 7 wherein the control means comprises an electronic switching element connected in series with each of the conductors which form the coil windings.

9. The coil assembly of claim 7 wherein the substrate comprises a circuit board, and the buses and the conductors are formed by a pattern of electrically conductive foil on a surface of the circuit board.

10. The coil assembly of claim 7 wherein the substrate comprises a body of semiconductor material on which the buses, the coil windings and the control means are formed in microminiature form.

11. The coil assembly of claim 7 wherein the substrate is flexible.

12. The coil assembly of claim 7 wherein the electrical conductors are arrayed on the substrate in a generally parallel relationship, and the substrate is wrapped about an axis generally perpendicular to the length of the conductors.

13. The coil assembly of claim 7 including an additional winding coupled inductively to the electrical conductors to form a transformer.

14. The coil assembly of claim 13 wherein the additional winding comprises a second substrate generally parallel to the first named substrate, first and second output conductors on the second substrate, and a plurality of electrical conductors connected electrically in parallel between the output conductors.

15. The coil assembly of claim 14 including rectifying elements connected electrically in series with the electrical conductors on the second substrate.

16. The coil assembly of claim 7 including an armature member positioned in proximity to the electrical conductors for movement in response to energization of said conductors.

17. The coil assembly of claim 16 wherein the armature member is moveable along an axis in a direction generally perpendicular to the conductors, and the substrate is wrapped about the axis with the conductors encircling the axis.

* * * * *